April 2, 1968   J. E. EDKINS ET AL   3,375,625
DOOR SEAL
Original Filed April 8, 1964   2 Sheets-Sheet 1
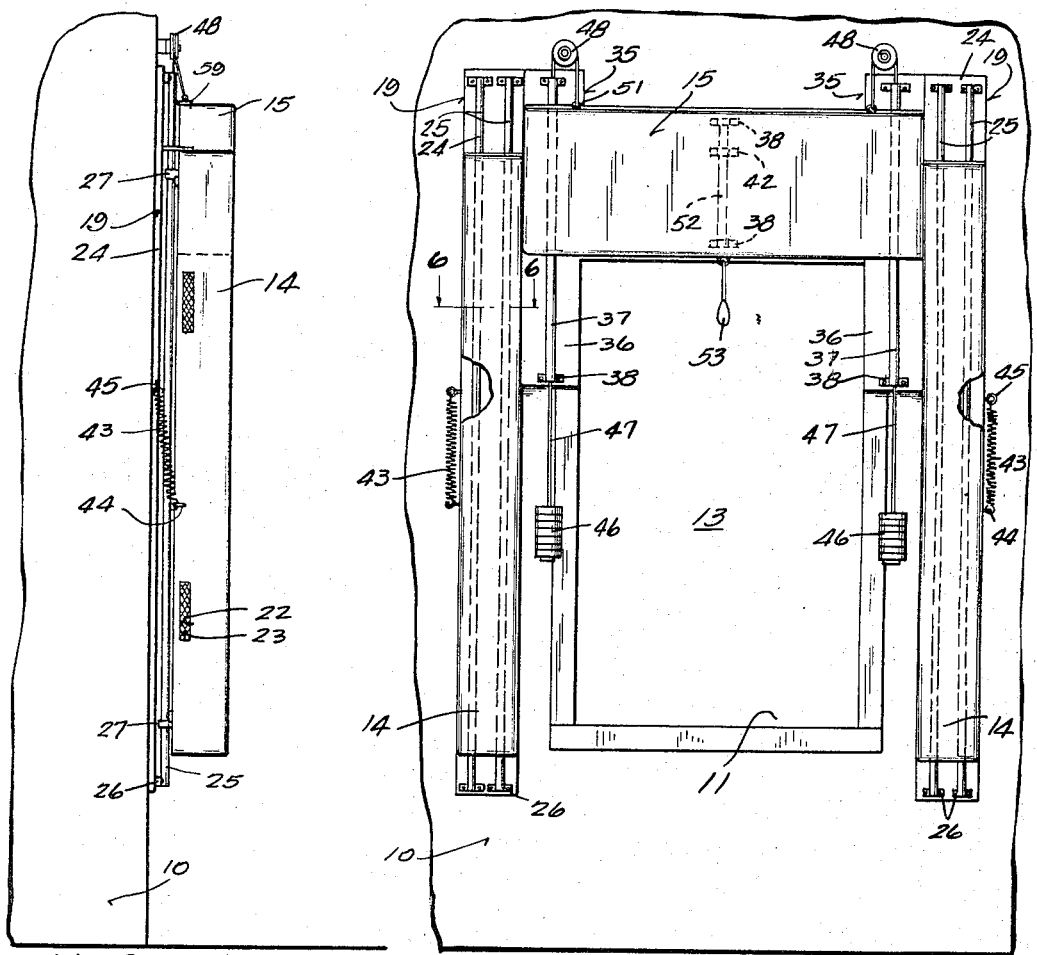
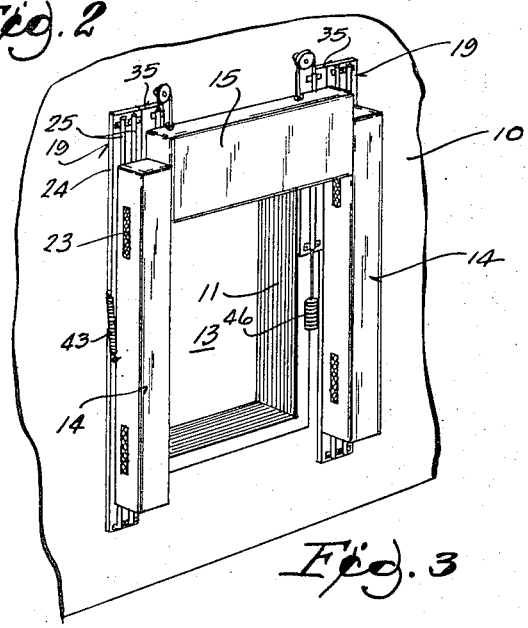
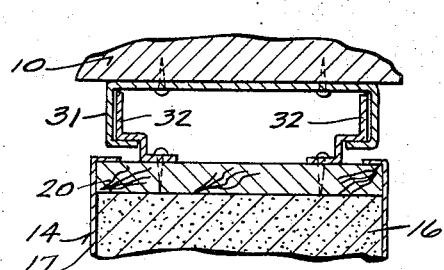
INVENTORS
JOHN E. EDKINS
ARLYN C. KRUEGER
PAUL A. RIEDER
BY
Wheeler, Wheeler & Wheeler
ATTORNEYS April 2, 1968   J. E. EDKINS ET AL   3,375,625
DOOR SEAL Original Filed April 8, 1964   2 Sheets-Sheet 2

INVENTORS
JOHN E. EDKINS
ARLYN C. KRUEGER
PAUL A. RIEDER
BY
Wheeler, Wheeler + Wheeler
ATTORNEYS

United States Patent Office 3,375,625
Patented Apr. 2, 1968

3,375,625
DOOR SEAL
John E. Edkins, Arlyn C. Krueger, and Paul A. Rieder, Fond du Lac, Wis., assignors to Medalist Industries, Inc., a corporation of Wisconsin
Continuation of application Ser. No. 358,293, April 8, 1964. This application May 24, 1967, Ser. No. 642,659
4 Claims. (Cl. 52—173)

This is a continuation of application Serial No. 358,-293 filed Apr. 8, 1964.

This invention relates to a door seal of the type which outlines the door opening of a building and which is adapted to seal against the rear edge of a truck which backs against the seal.

The door seal of the present invention is an improvement over prior art seals, for example, the one shown in United States Patent 2,704,574.

Prior art seals known to us have a fixed position about the door opening. Accordingly, when the truck which is pressed against the pads of such prior art door seal rises under pressure of its springs as the truck is unloaded or descends as its springs flex as the truck is loaded, there is considerable abrasion between the rear edge of the truck and the pads. This tends to wear out the pad covering and to exert undesirable dislocating forces on the pads and pad mountings. Prior art attempts known to us to solve these problems have been limited to reinforcing the fabric to resist wear and dislocating forces.

According to the present invention, the pads which outline the door opening are provided with mountings on which the pads may float or ride up and down with the truck as it is being loaded or unloaded. Accordingly, there is no displacement between the rear edge of the truck and the pads and the pad covering is not subject to wear. In effect, the pads bevome temporarily part of the truck and all relative displacement between the truck and dock occurs on pad slideways on which the pads are adapted to move.

In the disclosed embodiment of the invention, the pads along the sides of the door opening are spring biased to a mid position in the range of their vertical shifting movement of their slideways. Accordingly, a truck which is backed tightly against the pads can move either up or down freely and the pads will move with the truck as aforesaid. The pad over the top of the doorway is desirably counterbalanced by weights or the like to an elevated position. As the truck approaches the door, an operator will manually pull down on the topmost pad to align it with the roof edge of the truck body. After engagement by the truck, the top pad will be held for movement with the truck in unison with the side pads.

Other objects, features and advantages of the invention will appear from the following description, in which:

FIGURE 1 is a front elevation of a door seal structure embodying the present invention.

FIGURE 2 is a side elevation thereof.

FIGURE 3 is a perspective view thereof, on a somewhat reduced scale.

FIGURE 8 is a fragmentary cross section similar to FIGURE 6 through a modified embodiment of the invention.

Figure 4:
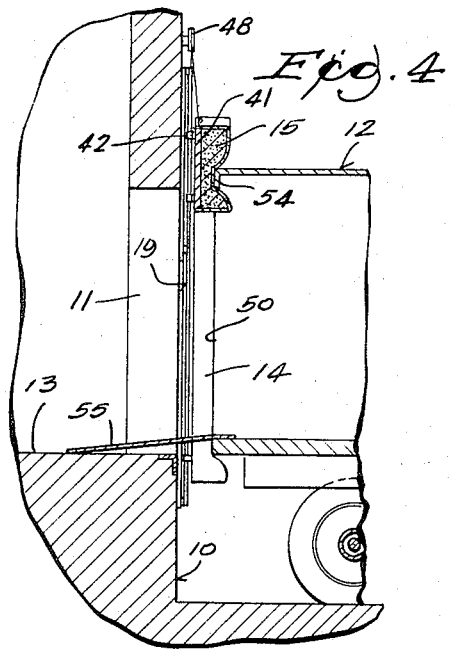
FIGURE 4 is a vertical cross section taken through a door seal structure embodying the present invention and through a truck which has backed into the seal, all parts being shown in an elevated position typified when the truck springs are relatively unflexed.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The door seal structure of the present invention is attached to the wall 10 of a building such as a warehouse or the like having a door opening 11. There may be a series of such door openings 11 along the wall 10. This is sometimes referred to as a loading dock. Trucks, such as truck 12 shown in FIGURES 4 and 5, back toward the dock to load and unload materials such as the containers 56 into and out of the dock area 13 and through the doorway 11.

According to the present invention, vertically elongated pads 14 are mounted at the sides of the doorway 11 and a horizontally elongated pad 15 is mounted at the top of the doorway 11. The respective pads 14, 15 may consist of resilient or compressible cushioning material 16, such as polyurethane resin foam, within a fabric cover 17 which desirably has a moisture-proof coating to protect the cushioning material 16 from the weather. Each foam pad 16 is adhesively or otherwise mounted on a panel strip 20, such as wood, and the cover 17 is also fastened to the panel 20 by nails 21 or the like. Cover 17 may be provided with air vent openings 22 covered by a loosely woven fabric patch 23 such as a saran web.

The respective panel strips 20 for the pads 14 are mounted for vertical sliding movement on a slideway structure 19 which is fastened in any manner desired to the wall 10 of the building. In the embodiment shown in FIGURES 1–7, the slideway structure 19 consists of a base panel strip 24 to which laterally spaced vertically elongated slide rods 25 are attached on stand-off brackets 26.

The rear faces of the pad panel strips 20 are provided with eye brackets 27 which are slidable on the rods 25. Accordingly, the pads 14 are free to move vertically on the slideway rods 25. Inasmuch as there are two laterally spaced parallel slide rods 25 for each pad 14, the pad is stabilized laterally in its sliding movement.

Other slideway construction could be used, for example the channel 31 as shown in FIGURE 8. The rear face of pad panel 20, in this modification, is provided with guide strips 32 embraced by the flanges of channel 31 and slidable vertically therein.

The top pad 15 has the same general construction as the pads 14, except that it is disposed horizontally. It is mounted for vertical movement near its ends on slideways 35, each consisting of a base panel 36, and pipe or rod track 37 mounted on standoff brackets 38. As in the case of the pads 14, the pad 15 has a base panel strip 41 with eye brackets 42 slidable on the rods 37.

The pad 15 is further provided with a central slideway consisting of the pipe or rod 52 which is also mounted on standoff brackets 38 to the wall 10. The rear panel 41 of the pad 15 is provided with a central eye bracket 42 slidable thereon.

As shown in FIGURES 1 and 3, the pads 15 have a horizontal dimension just slightly less than the lateral spacing of the proximate sides of the pads 14. Accordingly, the pad 15 fits between the pads 14 and is independently vertically adjustable with respect thereto on its own slideways 35.

Unless otherwise restrained, gravity would cause the respective pads 14, 15 to drop to the lower ends of their respective slideways 19, 35. However, pads 14 are provided with springs 43 which are connected to the sides of the pads 14 on screw eyes 44 and to the sides of the slideway base panel 24 on screw eyes 45. Springs 43 are adjusted to resiliently hold the pads 14 at approximately the mid positions in their permissible range of vertical movement on the slideways 19.

The pad 15 is biased to an elevated position on its slideways 35 by the counterweights 46 which are suspended on cables 47 which pass over pulleys 48 mounted on the top of slideways 35. The cables 47 are reeved over the pulleys 48 and are connected on screw eyes 51 to the top edge of the back panel 41 of the pad 15. The cables 37 desirably pass through the hollow pipe rods 37, thus to protect the cables from injury.

The bottom edge of the pad 15 is provided with a pull-down strap 53 by which its position can be manually adjusted. The counterweights 46 will bias the pad 15 to its uppermost position. However, the operator can pull the pad 15 downwardly on its slideways 35 to align it with the roof edge 54 of the truck 12 as the truck backs into the dock.

The vertical centerlines of the pads 14 are spaced laterally apart a distance equal to the conventional spacing of the rear edges 50 of the sides of the truck 12 (usually about 8 feet). Accordingly, when the truck 12 backs into the dock and the operator pulls down the pad 15 to align it with the edge 54 of the truck, the top edge 54 and side edges 50 of the truck body 12 will engage the respective pads 14, 15. Under typical back pressure the pads 14, 15 will be compressed, as shown in FIGURES 4 and 5, to provide a weather seal around the top and sides of the truck and to resiliently lock the truck body to the pads 14, 15.

The dock may be provided with a dockboard 55 over which materials handling vehicles or hand trucks can roll in the course of loading or unloading the truck.

Figure 5:
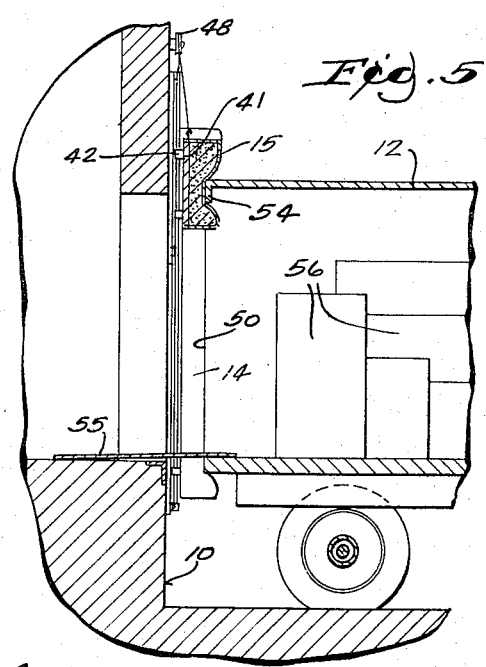
FIGURE 5 is a view similar to FIGURE 4 but showing the position of the various parts after the truck has been loaded and its springs have flexed to lower the level of the truck body and the various parts of the door seal.
Figure 6:
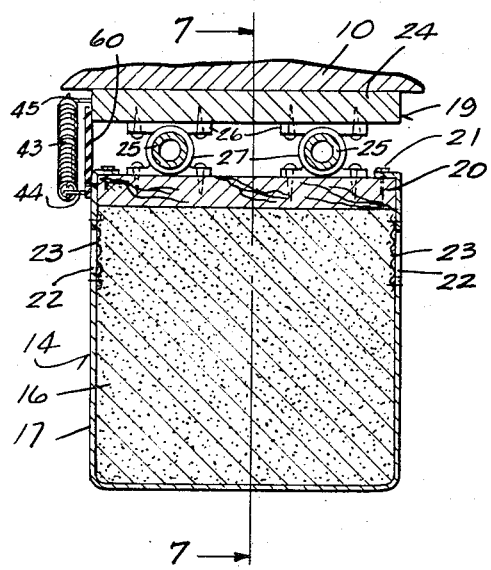
FIGURE 6 is a fragmentary cross section taken along the line 6—6 of FIGURE 1.
Figure 7:
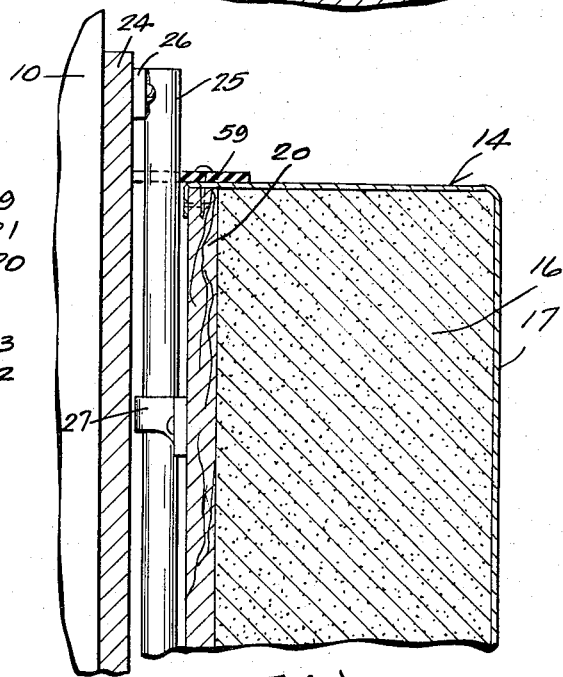
FIGURE 7 is a cross section taken along the lines 7—7 of FIGURE 6.

Assuming that an unloaded truck backs into the dock, the springs of the truck body are unflexed, thus to support the truck body in an elevated position as shown in FIGURE 4. As the truck is loaded, for example with containers 56, the added weight on the truck body will cause the truck springs to flex, and the truck body will descend, for example to its level shown in FIGURE 5.

In accordance with the present invention, however, there will be no displacement between the rear edges of the truck body and the pads 14, 15. This is because the pads are locked to the truck body and as the truck body descends, the pads will "float" or ride with the truck on their respective slideways. Accordingly, there will be no abrasion or wear occurring between the rear edge of the truck and the fabric 17 on the pads 14, 15, and the pad mountings will be freed of any dislocating forces.

If the truck is fully loaded when it backs into the dock, the converse occurs. As the truck contents 56 are unloaded and the springs of the truck unflex to lift the truck, the pads 14, 15 will ride or move upwardly with the truck to an elevated position.

When the truck leaves the dock, the pads automatically are restored to the position which they occupied prior to the arrival of the truck. If the truck had moved the pads to a low position, the bias springs 43 will restore the pads 14 to their mid positions and the counterweights 46 will elevate the top pad 15 to its topmost position. If the truck had lifted the pads 14 to a high position in which the springs 43 are relaxed, gravity will return the pads 14 to their mid positions, and the counterweights will elevate the top pad 15 to its topmost position.

The pads 14 are wide enough (approximately 12 inches in width) so that the truck need not be precisely aligned therewith in order to engage the pads and effectuate a seal against the dock. The topmost pad 15 is shown as somewhat wider in its vertical dimension than the pads 14 are in their horizontal dimension. This is because while all trucks have substantially the same width (8 feet, 0 inches), there will be a considerable variation in the height of the roof line of various trucks. This makes it desirable to have the top pad wider.

The pads 14, 15 may also be provided with weather seal strips such as 59, 60 to seal the spaces between the rear faces of the pads 14, 15 and the panel strips 24, 41 of the slideways 19, 35. Strips 59, 60 are free at their edges near the slideway back panels to sweep therealong as the pads move on their slideways.

It is clear from the foregoing description that the various pads are free to float vertically with the truck. When the truck leaves the dock, the side pads 14 will return to mid position and the top pad 15 will be biased to an elevated position. As the truck backs into the dock, the operator will manually position the top pad to meet the roof line of the truck and all pads 14, 15 will be substantially equally compressed by the truck, as shown in FIGURES 4 and 5. The compression of the pads will seal and lock the truck to the pads so that the pads move with the truck as it is being loaded or unloaded. Accordingly, the seal is not broken during such movement and there is no tendency of the truck to scrape or wear against the pads, or exert dislocating pressure against the pad mounts.

What is claimed is:

1. A door seal outlining the top and sides of a door opening and adapted to seal against the top and side rear edges of a truck which backs against the seal, said seal comprising pads along the top and sides of the door opening and mounting means on which the top and side pads are movable vertically with respect to said opening notwithstanding the back pressure of a truck thereagainst, said pads being compressible under pressure of the truck so as to be held by the truck for vertical movement on said mounting means in unison with the truck as the truck moves vertically and maintain said seal about the top and sides of the door opening without subjecting the pads to abrasion by the rear edges of the truck.

2. The door seal of claim 1 in which there is a space between the building and a pad, and a weather strip spanning said space.

3. The door seal of claim 1 in combination with means counterbalancing the weight of said pads.

4. The door seal of claim 1 in combination with a spring biasing said pads upwardly.

References Cited

UNITED STATES PATENTS

| 2,704,574 | 3/1955 | Etlar | 52—204 |
| 2,879,985 | 3/1959 | Waddell et al. | 267—1 |
| 3,181,205 | 5/1965 | Frommelt et al. | 52—204 |
| 3,230,675 | 1/1966 | Frammelt et al. | 52—204 XR |

KENNETH DOWNEY, *Primary Examiner.*